United States Patent
Ho et al.

(10) Patent No.: US 11,163,106 B2
(45) Date of Patent: Nov. 2, 2021

(54) MULTILAYER OPTO-ELECTRONIC MODULE

(71) Applicant: Chicony Power Technology Co., Ltd., New Taipei (TW)

(72) Inventors: Hsuan-Wei Ho, New Taipei (TW); Yueh-Heng Lee, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 16/948,044

(22) Filed: Aug. 28, 2020

(65) Prior Publication Data

US 2021/0063632 A1 Mar. 4, 2021

Related U.S. Application Data

(60) Provisional application No. 62/893,215, filed on Aug. 29, 2019.

(30) Foreign Application Priority Data

Aug. 7, 2020 (TW) .................................. 109126979

(51) Int. Cl.
*F21V 8/00* (2006.01)
*G06F 3/042* (2006.01)

(52) U.S. Cl.
CPC ......... *G02B 6/0076* (2013.01); *G02B 6/0043* (2013.01); *G02B 6/0055* (2013.01); *G02B 6/0073* (2013.01); *G06F 3/042* (2013.01)

(58) Field of Classification Search
CPC .. G02B 6/0076; G02B 6/0043; G02B 6/0073; G02B 6/0055; G02B 6/0086; G02B 6/006; G02B 6/0036; G02B 6/005; G02B 6/0041; G06F 3/042; G06F 1/169; G06F 1/1673

See application file for complete search history.

(56) References Cited

U.S. PATENT DOCUMENTS

| | | | |
|---|---|---|---|
| 7,139,046 B2 | 11/2006 | Katahira | |
| 9,182,631 B2 | 11/2015 | Bessho et al. | |
| 10,990,790 B2* | 4/2021 | Chien | G02F 1/133345 |
| 11,054,566 B2* | 7/2021 | Lee | G02B 27/0093 |

(Continued)

FOREIGN PATENT DOCUMENTS

| | | | |
|---|---|---|---|
| CN | 101509623 A | 8/2009 | |
| CN | 101751175 B | 10/2012 | |

(Continued)

*Primary Examiner* — John Bedtelyon
(74) *Attorney, Agent, or Firm* — Innovation Capital Law Group, LLP; Vic Lin

(57) ABSTRACT

A multilayer opto-electronic module includes a circuit board, a first light-emitting assembly, a second light-emitting assembly and a contact sheet. The first light-emitting assembly includes a first light guide sheet, a first light-shielding structure, and a first light-emitting element assembly. The second light-emitting assembly includes a second light guide sheet, a second light-shielding structure, and a second light-emitting element assembly. The second light-shielding structure has a second opening. The second opening corresponds to a first micro structure and a second micro structure. The contact sheet is above the second light-shielding structure. The contact sheet has a top transparent area. The top transparent area corresponds to the second opening.

12 Claims, 3 Drawing Sheets

(56) References Cited

U.S. PATENT DOCUMENTS

| | | |
|---|---|---|
| 2010/0259485 A1 | 10/2010 | Chuang |
| 2010/0271839 A1 | 10/2010 | Chan et al. |
| 2019/0285934 A1 | 9/2019 | Fujii |

FOREIGN PATENT DOCUMENTS

| | | |
|---|---|---|
| CN | 101751176 B | 6/2013 |
| CN | 103873627 A | 6/2014 |
| CN | 105892152 A | 8/2016 |
| CN | 207421963 U | 5/2018 |
| CN | 109388293 A | 2/2019 |
| CN | 106019716 B | 7/2019 |
| CN | 110177158 A | 8/2019 |
| CN | 209590476 U | 11/2019 |
| CN | 110658933 A | 1/2020 |
| TW | 201329566 A | 7/2013 |
| TW | I409677 B | 9/2013 |
| TW | M545922 U | 7/2017 |
| TW | M571515 U | 12/2018 |
| TW | 201911111 A | 3/2019 |
| TW | I669647 B | 8/2019 |

\* cited by examiner

MULTILAYER OPTO-ELECTRONIC MODULE

CROSS-REFERENCES TO RELATED APPLICATIONS

This application claims the priority benefit of U.S. provisional application Ser. No. 62/893,215, filed on Aug. 29, 2019 and Patent Application No. 109126979 filed in Taiwan, R.O.C. on Aug. 7, 2020. The entirety of the above-mentioned patent applications are hereby incorporated by references herein and made a part of the specification.

BACKGROUND

Technical Field

The present invention relates to an opto-electronic module, and in particular, to a touch panel with multiple light-emitting layers.

Related Art

Common electronic products such as notebook computers generally have physical keys and a touch panel. With the development of portable electronic products towards reducing thickness, less space can be used. In view of this, for some thin notebook computers, a virtual numeric keyboard may be displayed on the touch panel so as to save the space required by physical keys. To be specific, through a light-emitting touch module that integrates functions of the "touch panel" and a "backlight module", a numeric keyboard may be displayed on the touch panel by using the backlight module. This kind of light-emitting touch module is a type of a single-layer opto-electronic module.

SUMMARY

Nevertheless, the inventor finds that a multilayer opto-electronic module can provide a multi-functional operation interface. That is, in addition to displaying a numeric keyboard, the multilayer opto-electronic module can also be used as a user operation interface for displaying other visual patterns, for example, but not limited to, an operation image for adjusting the volume. However, when the multilayer opto-electronic module needs to display an image on one layer (for example, display only the numeric keyboard), the image may be affected by residual images on other layers (for example, an operation image for volume adjustment), resulting in a poor visual effect. In view of this, some embodiments of the present invention provide an opto-electronic module, and in particular, to a multilayer light-emitting touch module.

According to some embodiments of the present invention, a multilayer opto-electronic module includes a circuit board, a first light-emitting assembly, a second light-emitting assembly, and a contact sheet. The first light-emitting assembly includes a first light guide sheet, a first light-shielding structure, and a first light-emitting element assembly. The first light guide sheet is above the circuit board. The first light guide sheet has a first micro structure. The first light-shielding structure is above the first light guide sheet. The first light-shielding structure has a first opening. The first opening corresponds to the first micro structure. The first light-emitting element assembly is below the first light-shielding structure and at one side of the first light guide sheet and is electrically connected to the circuit board. When driven, the first light-emitting element assembly is configured to emit a first light towards the first light guide sheet. The second light-emitting assembly includes a second light guide sheet, a second light-shielding structure, and a second light-emitting element assembly. The second light guide sheet is above the first light-shielding structure. The second light guide sheet has a second micro structure. The second light-shielding structure is above the second light guide sheet. The second light-shielding structure has a second opening. The second opening corresponds to the first micro structure and the second micro structure. The second light-emitting element assembly is below the second light-shielding structure and at one side of the second light guide sheet and is electrically connected to the circuit board. When driven, the second light-emitting element assembly is configured to emit a second light towards the second light guide sheet. The contact sheet is above the second light-shielding structure. The contact sheet has a top transparent area. The top transparent area corresponds to the second opening.

According to some embodiments of the present invention, the multilayer opto-electronic module further includes a third light-emitting assembly and an intermediate spacer. The third light-emitting assembly includes a third light guide sheet, a third light-shielding structure, and a third light-emitting element assembly. The third light guide sheet is above the second light-shielding structure. The third light guide sheet has a third micro structure. The third light-shielding structure is above the third light guide sheet. The third light-shielding structure has a third opening. The third opening corresponds to the first micro structure, the second micro structure, and the third micro structure. The third light-emitting element assembly is located below the third light-shielding structure and at one side of the third light guide sheet and is electrically connected to the circuit board. When driven, the third light-emitting element assembly is configured to emit a third light towards the third light guide sheet. The intermediate spacer is between the third light-emitting element assembly and the second light guide sheet, configured to block the third light from entering the second light guide sheet and the second light-shielding structure.

According to some embodiments of the present invention, the multilayer opto-electronic module further includes an internal spacer. The internal spacer is between the second light-emitting element assembly and the first light guide sheet, configured to block the second light from entering the first light guide sheet and the first light-shielding structure.

According to some embodiments of the present invention, the multilayer opto-electronic module further includes an external spacer. The external spacer is outside the first light-emitting assembly and the second light guide sheet and is between the contact sheet and the circuit board, configured to block the first light and the second light from escaping from the multilayer opto-electronic module.

According to some embodiments of the present invention, the multilayer opto-electronic module further includes a third light-emitting assembly and an intermediate spacer. The third light-emitting assembly includes a third light guide sheet, a third light-shielding structure, and a third light-emitting element assembly. The third light guide sheet is above the second light-shielding structure. The third light guide sheet has a third micro structure. The third light-shielding structure is above the third light guide sheet. The third light-shielding structure has a third opening. The third opening corresponds to the first micro structure, the second micro structure, and the third micro structure. The third light-emitting element assembly is below the third light-shielding structure and at one side of the third light guide sheet and is electrically connected to the circuit board. When driven, the third light-emitting element assembly is configured to emit a third light towards the third light guide sheet. The intermediate spacer is between the third light-emitting element assembly and the first light guide sheet as well as the second light guide sheet, configured to block the third light from entering the first light guide sheet, the first light-shielding structure, the second light guide sheet, and the second light-shielding structure.

Therefore, according to some embodiments, the multilayer opto-electronic module uses a light blocking structure located between the second light-emitting element assembly and the first light guide sheet to block the second light emitted by the second light-emitting element assembly from reaching the first light guide sheet and the first light-shielding structure, avoiding residual image caused by the second light illuminating the first micro structure and also avoiding light leakage caused by the second light illuminating the first light-shielding structure. That is, when the second light-emitting assembly is individually illuminated, the first light-emitting assembly can be prevented from being simultaneously illuminated to affect the visual effect, thereby eliminating the problems of residual image and light leakage.

The following details are illustrated by specific embodiments in conjunction with the accompanying drawings, so that it is easier to understand the objectives, the technical content, and the characteristics of the present invention and the effects achieved.

DETAILED DESCRIPTION

Figure 1:
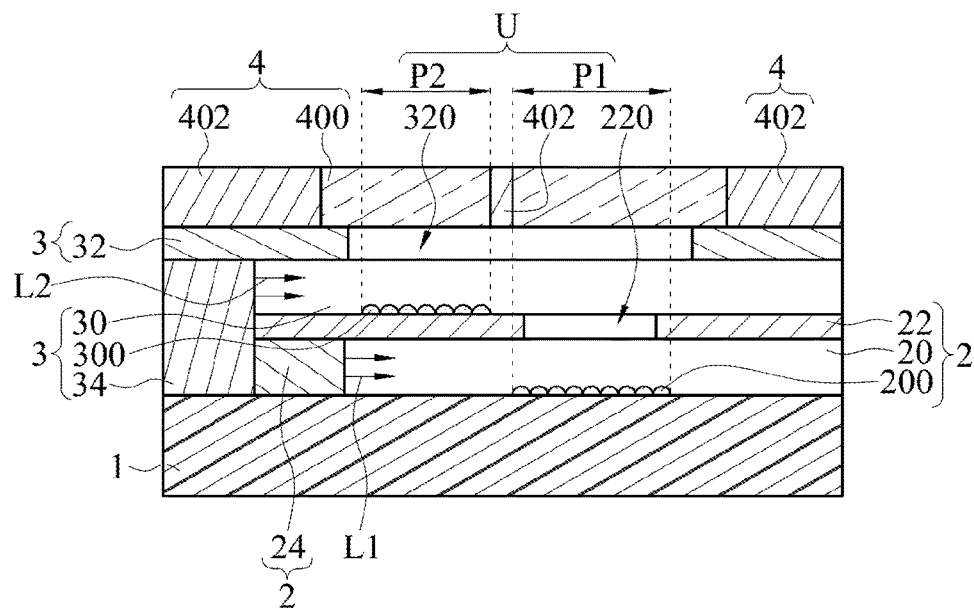
FIG. 1 is a schematic side view of a multilayer opto-electronic module according to some embodiments of the present invention.

The embodiments of the present invention are described in detail below and illustrated with reference to the drawings. In the description of the specification, in order to make the reader have a more complete understanding of the present invention, many specific details are provided. However, the present invention may be implemented on the premise of omitting some or all of the specific details. The same or similar elements in the drawings are represented by the same or similar symbols. In particular, the drawings are only for schematic purposes, and do not represent an actual dimension or number of elements. Some details may not be completely drawn, so as to keep the drawings concise.

Referring to FIG. 1, a multilayer opto-electronic module according to an embodiment of the present invention includes a circuit board 1, a first light-emitting assembly 2, a second light-emitting assembly 3, and a contact sheet 4.

In some embodiments, the multilayer opto-electronic module is a multi-functional touchpad that combines a touch panel and a backlight module, and generally has at least four operation modes. (I) In a common mode, the multilayer opto-electronic module appears opaque when not emitting light, which looks the same as a common touch panel and can be used for controlling a mouse cursor to click to select and control, and the like. (II) In a full light-emitting mode, the multilayer opto-electronic module can display all the virtual keys and visual images, for example, but not limited to, operation characters such as a virtual numeric keyboard in a particular area, and operation images such as a fan speed, a speaker volume, and screen brightness of a computer in other areas. By taking application of the foregoing notebook computer as an example, a controller of the notebook computer will perform the function based on a touch signal returned from the multilayer opto-electronic module as a corresponding operation character/image being pressed. (III) In a first light-emitting mode, the multilayer opto-electronic module can display a first pattern and/or character, for example, a virtual numeric keyboard and checkerboard lines. By taking application of the foregoing notebook computer as an example, the controller of the notebook computer will perform the function, for example, calculation, based on the touch signal returned from the multilayer opto-electronic module as a corresponding operation character/image being pressed. (IV) In a second light-emitting mode, the multilayer opto-electronic module can display a second pattern and/or character, for example, an operation image for adjusting numerical values such as a fan speed, a speaker volume, and screen brightness of a computer. By taking application of the foregoing notebook computer as an example, the controller of the notebook computer will perform the function, for example, adjustment of numerical values such as a fan speed, a speaker volume, and screen brightness of the notebook computer, based on the touch signal returned from the multilayer opto-electronic module as a corresponding operation character/image being pressed. In some embodiments, the second light-emitting mode is used for displaying the foregoing operation character/image (such as a fan speed, a speaker volume, and screen brightness of a computer) for a user to visually confirm a current working state of hardware/software, but not for corresponding touch function.

In some embodiments, the circuit board 1 is a flexible printed circuit board. For example, the circuit board is a glass fiber (FR4/FR5/FRP) printed circuit board.

In some embodiments, the first light-emitting assembly 2 includes a first light guide sheet 20, a first light-shielding structure 22, and a first light-emitting element assembly 24. The first light guide sheet 20 is located above the circuit board 1, and the first light guide sheet 20 is located at a light-emitting side of the first light-emitting element assembly 24. The first light guide sheet 20 has a first micro structure 200, and the geometry and dimension of the first micro structure 200 are associated with a first predetermined pattern P1. In some embodiments, the first micro structure 200 is formed by a plurality of dots (or called grid points), which may be convex or concave, but are not limited thereto, and may be in any shape. In some embodiments, the first predetermined pattern P1 may be, for example, but not limited to, operation characters such as a numeric keyboard including checkerboard lines and/or a character.

The first light-shielding structure 22 is located above the first light guide sheet 20. The first light-shielding structure 22 has a first opening 220. The first opening 220 corresponds to the first micro structure 200.

The first light-emitting element assembly 24 is located below the first light-shielding structure 22 and at one side of the first light guide sheet 20, that is, viewed from a side, the first light-emitting element assembly 24 and the first light guide sheet 20 are arranged side by side on the circuit board 1. The first light-emitting element assembly 24 is electrically connected to the circuit board 1. When the circuit board 1 drives the first light-emitting element assembly 24 through, for example, a driving circuit, the first light-emitting element assembly 24 emits a first light L1 towards the first light guide sheet 20. In some embodiments, the first light-emitting element assembly 24 includes a plurality of light emitting diode elements, but is not limited thereto.

Specifically, when the first light-emitting element assembly 24 emits light, the first light L1 is emitted onto the side of the first light guide sheet 20 and enters the first light guide sheet 20, and undergoes total internal reflection when it reaches the boundary of the first light guide sheet 20, so as to improve light utilization. In other words, when the first light L1 propagates in the first light guide sheet 20 via total internal reflection, the first micro structure 200 may destroy a propagating path of the first light L1 (for example, change an angle of its reflecting surface), so that a majority of the first light L1 goes out towards the corresponding first opening 220. In this way, the first light guide sheet 20 guides the first light L1 to the first micro structure 200 to go out towards the first opening 220, and the first predetermined pattern P1 associated with the first micro structure 200 is displayed.

The second light-emitting assembly 3 includes a second light guide sheet 30, a second light-shielding structure 32, and a second light-emitting element assembly 34. The second light guide sheet 30 is located above the first light-shielding structure 22, and the second light guide sheet 30 is located at a light-emitting side of the second light-emitting element assembly 34. The second light guide sheet 30 has a second micro structure 300, and the geometry and dimension of the second micro structure 300 are associated with a second predetermined pattern P2. In some embodiments, the second micro structure 300 is formed by a plurality of dots (or called grid points), which may be convex or concave, but are not limited thereto, and may be in any shape. In some embodiments, the second predetermined pattern P2 may be, for example, but not limited to, an operation image for adjusting numerical values such as a fan speed, a speaker volume, and screen brightness of a computer.

The second light-shielding structure 32 is located above the second light guide sheet 30. The second light-shielding structure 32 has a second opening 320, and the second opening 320 corresponds to the first micro structure 200 and the second micro structure 300. Specifically, an orthographic projection of the first micro structure 200 with respect to the second light-shielding structure 32 overlaps with part of the area of the second opening 320, and an orthographic projection of the second micro structure 300 with respect to the second light-shielding structure 32 overlaps with another area of the second opening 320. Therefore, the first light L1 reflected by the first micro structure 200 may pass through the second opening 320, and the first predetermined pattern P1 presented outside the contact sheet 4 may be determined through a top transparent area 400, and a second light L2 reflected by the second micro structure 300 may pass through the second opening 320 and the second predetermined pattern P2 presented outside the contact sheet 4 may be determined through the top transparent area 400. It may be known from the above description that, viewed from the top, an opening cross-sectional area of the second opening 320 is determined jointly by the first micro structure 200 and the second micro structure 300, so the cross-sectional area of the second opening 320 is greater than or equal to a combined pattern U formed by the first predetermined pattern P1 and the second predetermined pattern P2. In some embodiments, viewed from the top, the second opening 320 is a continuous hollowed-out area, but is not limited thereto. An orthographic projection of the first micro structure 200 with respect to the second light-shielding structure 32 and an orthographic projection of the second micro structure 300 with respect to the second light-shielding structure 32 jointly determine an external contour and a diameter of the second opening 320. In some embodiments, viewed from the top, a sectional dimension of the second opening 320 expands outwardly by an enlargement amount compared with a combined sectional dimension of the first micro structure 200 and the second micro structure 300, and the enlargement amount is directly proportional to a predetermined value, but the second light-emitting element assembly 34 is invisible seeing from outside of the second opening 320. The predetermined value may be, but not limited to, a manufacturing tolerance. For example, the predetermined value includes, but is not limited to, a displacement tolerance of ink printing, expansion and contraction tolerances, an assembly tolerance between elements, and a shape cutting tolerance.

The second light-emitting element assembly 34 is located below the second light-shielding structure 32 and at one side of the second light guide sheet 30. In a schematic side view shown in FIG. 1, the second light-emitting element assembly 34 and the second light guide sheet 30 are arranged side by side below the second light-shielding structure 32. In this embodiment, the second light-emitting element assembly 34 and the first light-emitting element assembly 24 are disposed adjacent to each other. Therefore, the first light-emitting element assembly 24 is located between the second light-emitting element assembly 34 and the first light guide sheet 20, available for blocking the second light L2 emitted by the second light-emitting element assembly 34 from reaching the first light guide sheet 20. That is, the first light-emitting element assembly 24 serves as a light blocking structure between the second light-emitting element assembly 34 and the first light guide sheet 20.

The second light-emitting element assembly 34 is electrically connected to the circuit board 1. When the circuit board 1 drives the second light-emitting element assembly 34 through, for example, a driving circuit, the second light-emitting element assembly 34 emits a second light L2 towards the second light guide sheet 30. In some embodiments, the second light-emitting element assembly 34 includes a plurality of light emitting diode elements, but is not limited thereto. Specifically, when the second light-emitting element assembly 34 emits light, the second light L2 is emitted onto the side of the second light guide sheet 30 and enters the second light guide sheet 30, and undergoes total internal reflection when it reaches the boundary of the second light guide sheet 30, so as to improve light utilization. That is, the second light guide sheet 30 guides the second light L2 to the second micro structure 300 to be emitted towards the corresponding second opening 320. In other words, when the second light L2 propagates in the second light guide sheet 30 via total internal reflection, the second micro structure 300 may destroy a propagating path of the second light L2 (for example, change an angle of its reflecting surface), so that more the second light L2 is emitted towards the corresponding second opening 320. In this way, the second light guide sheet 30 guides the second light L2 to the second micro structure 300 to go out towards the corresponding second opening 320. Since the second light L2 is physically blocked by the first light-emitting element assembly 24, the second light may not enter the first light guide sheet 20, thereby avoiding unwanted residual image of the first predetermined pattern P1 caused by the second light L2 illuminating the first micro structure 200. Therefore, when the second light-emitting assembly 3 is individually illuminated, the first light-emitting assembly 2 can be prevented from being simultaneously illuminated to affect the visual effect, thereby eliminating the problems of residual image and light leakage.

The contact sheet 4 is located above the second light-shielding structure 32. The contact sheet 4 has a top transparent area 400. The top transparent area 400 vertically corresponds to the second opening 320. The top transparent area 400 includes respective geometric contours of the first predetermined pattern P1 and the second predetermined pattern P2 in the combined pattern U. The combined pattern U includes the first predetermined pattern P1 and the second predetermined pattern P2 but does not include an opaque area 402 between the first predetermined pattern P1 and the second predetermined pattern P2. That is, a distribution position and a contour shape of the top transparent area 400 are determined by the first predetermined pattern P1 and the second predetermined pattern P2, and therefore the top transparent area 400 corresponds to the first predetermined pattern P1 and the second predetermined pattern P2 respectively. The second light L2 reflected by the second micro structure 300 may pass through the top transparent area 400 and present the second predetermined pattern P2 outside the contact sheet 4, for the user to see the second predetermined pattern P2 from above the contact sheet 4. In this embodiment, viewed from the top, a sectional dimension of the top transparent area 400 expands outwardly by an enlargement amount compared with a combined sectional dimension of the first micro structure 200 and the second micro structure 300, and the enlargement amount is directly proportional to a predetermined value. The predetermined value may be, but not limited to, a manufacturing tolerance. For example, the predetermined value includes, but is not limited to, a displacement tolerance of ink printing, expansion and contraction tolerances, an assembly tolerance between elements, and a shape cutting tolerance.

Still referring to FIG. 1, in some embodiments, the contact sheet 4 has a top transparent area 400 and an opaque area 402 adjacent to each other. The opaque area 402 is used for shielding the second light L2 and the first light L1, so that the light below the opaque area 402 hardly penetrates the contact sheet 4 to provide high light utilization and prevent an ambient light from entering the multilayer opto-electronic module. In an example, the opaque area 402 may be formed by printing/coating an opaque ink on a bottom surface of the contact sheet 4. The opaque ink is distributed outside the top transparent area 400.

In some embodiments, viewed from the top, a cross-sectional area of the first opening 220 is less than that of the first micro structure 200, helping to form a well-defined and sharp image of the first predetermined pattern P1.

Figure 2:
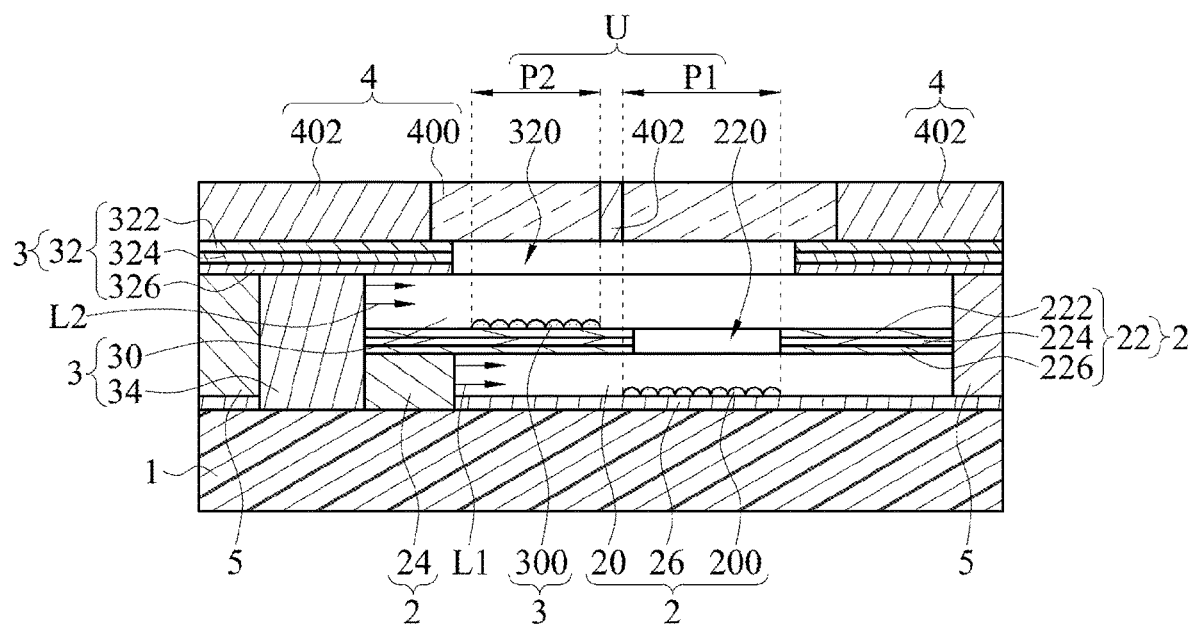
FIG. 2 is a schematic side view of a multilayer opto-electronic module according to some embodiments of the present invention.

Referring to FIG. 2, in some embodiments, the first light-shielding structure 22 is a light-shielding sheet. The light-shielding sheet includes a film 222 and a light-absorbing film 224. The light-absorbing film 224 is located on a bottom surface of the film 222 and faces the first light guide sheet 20. Viewed from the top, the film 222 and the light-absorbing film 224 have corresponding openings in a vertical direction respectively, and the openings are communicated with each other to form the first opening 220.

That is, the first opening 220 passes through the film 222 and the light-absorbing film 224, but is not limited thereto. In another embodiment, the first opening 220 may also be implemented by printing the light-absorbing film 224 with a hollowed-out area, such as a black ink, on the film 222 without an opening to form a transparent area. Therefore, the light-absorbing film 224 may absorb and shield the first light L1 from the first light guide sheet 20, so that the first light L1 below the film 222 hardly penetrates the film 222, thereby reducing light disturbance caused by leakage of the first light L1. In an example, the light-absorbing film 224 may be formed by printing/coating an opaque ink on a bottom surface of the film 222.

Similarly, the second light-shielding structure 32 is a light-shielding sheet. The light-shielding sheet includes a film 322 and a light-absorbing film 324. The light-absorbing film 324 is located on a bottom surface of the film 322 and faces the second light guide sheet 30. Viewed from the top, the film 322 and the light-absorbing film 324 have corresponding openings in a vertical direction respectively, and the openings are communicated with each other to form the second opening 320. That is, the second opening 320 passes through the film 322 and the light-absorbing film 324, but is not limited thereto. In another embodiment, the second opening 320 may also be achieved by printing the light-absorbing film 324 with a hollowed-out area, such as a black ink, on the film 322 without an opening to form a transparent area. Therefore, the light-absorbing film 324 may absorb and shield the second light L2 from the second light guide sheet 30, so that the second light L2 below the film 322 hardly penetrates the film 322, thereby reducing light disturbance caused by leakage of the second light L2. In an example, the light-absorbing film 324 may be formed by printing/coating an opaque ink on a bottom surface of the film 322.

In some embodiments, the first light-shielding structure 22 further includes a first reflecting film 226. The first reflecting film 226 is located above the first light guide sheet 20. The film 222, the light-absorbing film 224, and the first reflecting film 226 have corresponding openings in a vertical direction respectively, and the openings are communicated with each other to form the first opening 220. That is, the first opening 220 passes through the first reflecting film 226, but is not limited thereto. In another embodiment, the first opening 220 may also be achieved by printing the first reflecting film 226 with a hollowed-out area, such as a black ink, below the light-absorbing film 224 to form a transparent area. Therefore, the first reflecting film 226 reflects the first light L1 escaping from the first light guide sheet 20 back to the first light guide sheet 20 for reuse, thereby optimizing the brightness of the first light guide sheet 20 and effectively improving light utilization of the first light guide sheet 20.

Similarly, the second light-shielding structure 32 includes a second reflecting film 326. The second reflecting film 326 is located above the second light guide sheet 30. The film 322, the light-absorbing film 324, and the second reflecting film 326 have corresponding openings in a vertical direction respectively, and the openings are communicated with each other to form the second opening 320. That is, the second opening 320 passes through the second reflecting film 326, but is not limited thereto. In another embodiment, the second opening 320 may also be achieved by printing the second reflecting film 326 with a hollowed-out area, such as a black ink, below the light-absorbing film 324 to form a transparent area. Therefore, the second reflecting film 326 reflects the second light L2 escaping from the second light guide sheet 30 back to the second light guide sheet 30 for reuse, thereby optimizing the brightness of the second light guide sheet 30 and effectively improving light utilization of the second light guide sheet 30.

Still referring to FIG. 2, in some embodiments, the multilayer opto-electronic module further includes an external spacer 5. The external spacer 5 is located outside the first light-emitting assembly 2, the second light-emitting element assembly 34, and the second light guide sheet 30, and the external spacer 5 is located between the contact sheet 4 and the circuit board 1. Therefore, the external spacer 5 may block the first light L1 and the second light L2 from escaping from the multilayer opto-electronic module, thereby avoiding light leakage.

In some embodiments, the first light-emitting assembly 2 further includes a light-absorbing film 26. The light-absorbing film 26 is located below the first light guide sheet 20. For example, the light-absorbing film 26 is located between the circuit board 1 and the first light guide sheet 20. In an example, the light-absorbing film 26 may be modified by printing/coating an opaque ink on an upper surface of a reflecting film. The opaque ink may be a black opaque ink. Therefore, the light-absorbing film 26 may absorb a light to prevent the light from emitting upward, so as to reduce light disturbance.

Figure 3:
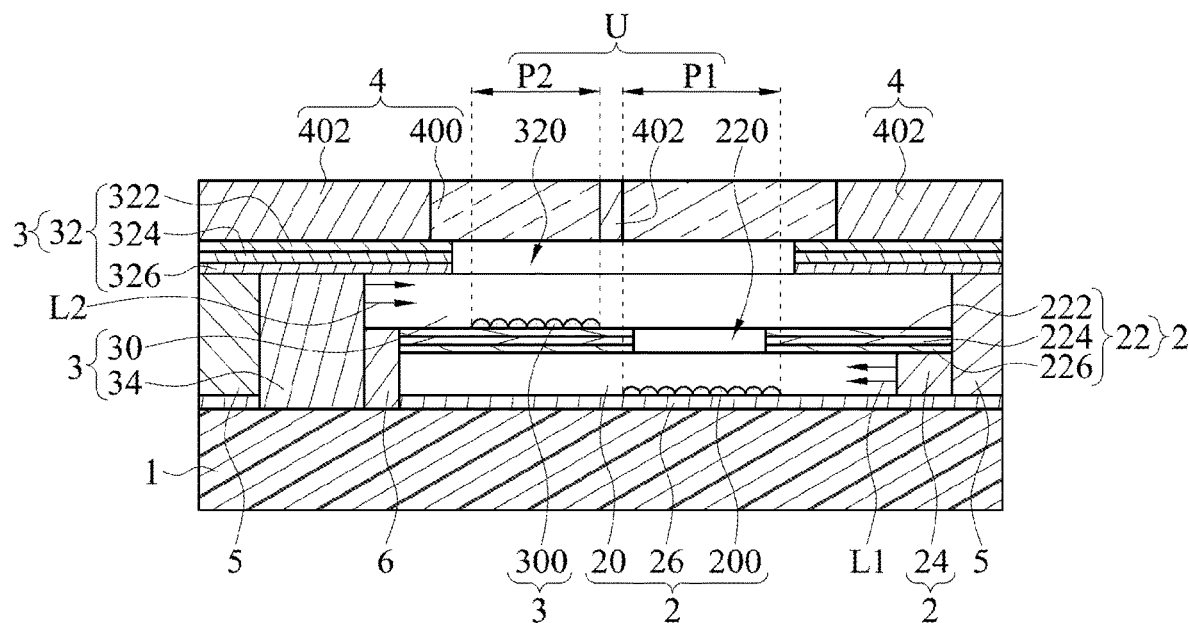
FIG. 3 is a schematic side view of a multilayer opto-electronic module according to some embodiments of the present invention.

Referring to FIG. 3, in some embodiments, the second light-emitting element assembly 34 and the first light-emitting element assembly 24 are disposed opposite to each other, and the second light-emitting element assembly 34 and the first light-emitting element assembly 24 are located on two opposite sides of the first light guide sheet 20 respectively, but are not limited thereto. In another embodiment, the second light-emitting element assembly 34 and the first light-emitting element assembly 24 are disposed on two adjacent sides of the first light guide sheet 20, which appears, for example, L-shaped when viewed from the top. The multilayer opto-electronic module further includes an internal spacer 6. The internal spacer 6 is located between the second light-emitting element assembly 34 and the first light guide sheet 20. Therefore, the internal spacer 6 may block the second light L2 from reaching the first light guide sheet 20 and the first light-shielding structure 22. That is, the internal spacer 6 serves as a light blocking structure between the second light-emitting element assembly 34 and the first light guide sheet 20 as well as the first light-shielding structure 22.

In some embodiments, the internal spacer 6 is a light-absorbing sponge, helping to block the second light L2 from reaching the first light guide sheet 20 and the first light-shielding structure 22. In an example, the multilayer opto-electronic module further includes two adhesive layers. The two adhesive layers are respectively located on surfaces of the light-absorbing sponge facing the second light guide sheet 30 and the circuit board 1. Therefore, through elastic deformation of the sponge body, a small gap between the internal spacer 6 and the elements, such as the second light guide sheet 30 and the circuit board 1, can be fully filled, helping to improve a light-absorbing/light-blocking effect.

Still referring to FIG. 3, in some embodiments, the multilayer opto-electronic module further includes an external spacer 5. The external spacer 5 is located outside the first light-emitting assembly 2, the second light-emitting element assembly 34, and the second light guide sheet 30, and the external spacer 5 is located between the contact sheet 4 and the circuit board 1. Therefore, the external spacer 5 may block the first light L1 and the second light L2 from escaping from the multilayer opto-electronic module. In an example, the internal spacer 6 and the external spacer 5 are integrally formed as one, helping to reduce a light-leaking gap caused by an assembly tolerance.

Figure 4:
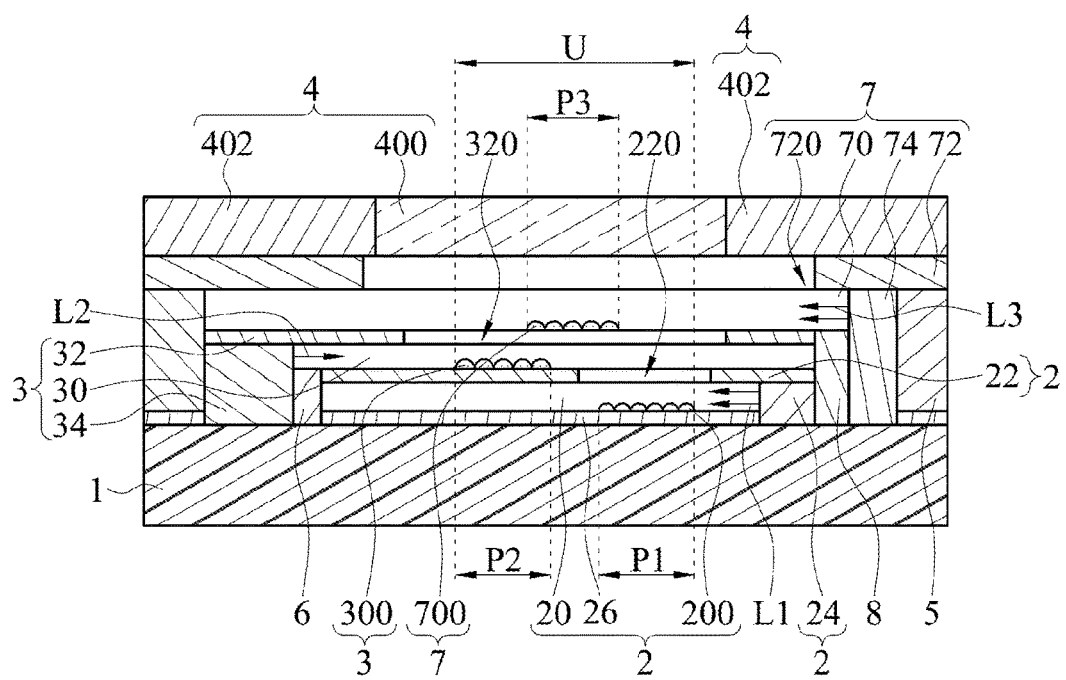
FIG. 4 is a schematic side view of a multilayer opto-electronic module according to some embodiments of the present invention.

Referring to FIG. 4, in some embodiments, the multilayer opto-electronic module further includes a third light-emitting assembly 7 and an intermediate spacer 8. The third light-emitting assembly 7 includes a third light guide sheet 70, a third light-shielding structure 72, and a third light-emitting element assembly 74. The third light guide sheet 70 is located above the second light-shielding structure 32, and the third light guide sheet 70 is located at a light-emitting side of the third light-emitting element assembly 74. The third light guide sheet 70 has a third micro structure 700, and the geometry and dimension of the third micro structure 700 are associated with a third predetermined pattern P3. In some embodiments, the third micro structure 700 is formed by a plurality of dots (or called grid points), which may be convex or concave, but are not limited thereto, and may be in any shape. In some embodiments, the third predetermined pattern P3 may be, for example, but not limited to, interactive text and graphics, visual cues, and other patterns.

The third light-shielding structure 72 is located above the third light guide sheet 70. The third light-shielding structure 72 has a third opening 720. The third opening 720 corresponds to the first micro structure 200, the second micro structure 300, and the third micro structure 700. Specifically, orthographic projections of the first micro structure 200, the second micro structure 300, and the third micro structure 700 with respect to the third light-shielding structure 72 overlap with the third opening 720. Therefore, the first light L1 reflected by the first micro structure 200 may pass through the third opening 720, and the first predetermined pattern P1 presented outside the contact sheet 4 may be determined through the top transparent area 400, the second light L2 reflected by the second micro structure 300 may pass through the third opening 720, and the second predetermined pattern P2 presented outside the contact sheet 4 may be determined through the top transparent area 400, and a third light L3 reflected by the third micro structure 700 may pass through the third opening 720, and the third predetermined pattern P3 presented outside the contact sheet 4 may be determined through the top transparent area 400, for the user to simultaneously or individually see the first predetermined pattern P1, the second predetermined pattern P2, and/or the third predetermined pattern P3 from above the contact sheet 4. It may be known from the above description that, viewed from the top, an opening cross-sectional area of the third opening 720 is determined jointly by the first micro structure 200, the second micro structure 300, and the third micro structure 700, so the cross-sectional area of the third opening 720 is greater than or equal to a combined pattern U formed by the first predetermined pattern P1, the second predetermined pattern P2, and the third predetermined pattern P3. Therefore, viewed from the side, the top transparent area 400 vertically corresponds to the third opening 720. A light-transmitting pattern of the top transparent area 400 includes respective geometric contours of the first predetermined pattern P1, the second predetermined pattern P2, and the third predetermined pattern P3 in the combined pattern U. In some embodiments, viewed from the top, a cross section of the third opening 720 is a continuous hollowed-out area, but is not limited thereto. An orthographic projection of the first micro structure 200 with respect to the third light-shielding structure 72, an orthographic projection of the second micro structure 300 with respect to the third light-shielding structure 72, and an orthographic projection of the third micro structure 700 with respect to the third light-shielding structure 72 jointly determine an external contour and a cross-sectional area of the third opening 720. That is, the third opening 720 vertically corresponds to the first micro structure 200, the second micro structure 300, and the third micro structure 700. In some embodiments, viewed from the top, a sectional dimension of the third opening 720 expands outwardly by an enlargement amount compared with a combined sectional dimension of the first micro structure 200, the second micro structure 300, and the third micro structure 700, and the enlargement amount is directly proportional to a predetermined value, but the third light-emitting element assembly 74 is not exposed out of the third opening 720. The predetermined value may be, but not limited to, a manufacturing tolerance. For example, the predetermined value includes, but is not limited to, a displacement tolerance of ink printing, expansion and contraction tolerances, an assembly tolerance between elements, and a shape cutting tolerance.

The third light-emitting element assembly 74 is located below the third light-shielding structure 72 and at one side of the third light guide sheet 70. In a schematic side view shown in FIG. 4, the third light-emitting element assembly 74 and the third light guide sheet 70 are arranged side by side below the third light-shielding structure 72. In this embodiment, the third light-emitting element assembly 74 and the second light-emitting element assembly 34 are disposed opposite to each other, and the second light-emitting element assembly 34 and the first light-emitting element assembly 24 are located on two opposite sides of the first light guide sheet 20 respectively, but are not limited thereto. In another embodiment, the third light-emitting element assembly 74, the second light-emitting element assembly 34, and the first light-emitting element assembly 24 are arranged adjacent to each other in an interchangeable order, which appears, for example, U-shaped. The intermediate spacer 8 is located between the third light-emitting element assembly 74 and the second light guide sheet 30, available for blocking the third light L3 from entering the second light guide sheet 30 and the second light-shielding structure 32. That is, the intermediate spacer 8 serves as a light blocking structure between the third light-emitting element assembly 74 and the second light guide sheet 30 as well as the second light-shielding structure 32. In some embodiments, the external spacer 5, the internal spacer 6, and the intermediate spacer 8 are integrally formed as one, but are not limited thereto.

The third light-emitting element assembly 74 is electrically connected to the circuit board 1. When the circuit board 1 drives the third light-emitting element assembly 74 through, for example, a driving circuit, the third light-emitting element assembly 74 emits the third light L3 towards the third light guide sheet 70. In some embodiments, the third light-emitting element assembly 74 includes a plurality of light-emitting diode elements, but is not limited thereto. Specifically, when the third light-emitting element assembly 74 emits light, the third light L3 is emitted onto the side of the third light guide sheet 70 and enters the third light guide sheet 70, and undergoes total internal reflection when it reaches the boundary of the third light guide sheet 70, so as to improve light utilization. That is, the third light guide sheet 70 guides the third light L3 to the third micro structure 700 to be emitted towards the third opening 720. In other words, when the third light L3 propagates in the third light guide sheet 70 via total internal reflection, the third micro structure 700 may destroy a propagating path of the third light L3 (for example, change an angle of its reflecting surface), so that more the third light L3 is emitted towards the corresponding third opening 720. In this way, the third light guide sheet 70 guides the third light L3 to the third micro structure 700 to go out towards the corresponding third opening 720, so as to pass through the top transparent area 400 and present the third predetermined pattern P3 outside the contact sheet 4, for the user to view. Since the third light L3 is physically blocked by the intermediate spacer 8, the third light L3 may not enter the second light guide sheet 30 and the second light-shielding structure 32, thereby avoiding unwanted residual image of the second predetermined pattern P2 caused by the third light L3 illuminating the second micro structure 300 and also avoiding light leakage caused by the third light L3 illuminating the second light-shielding structure 32.

Figure 5:
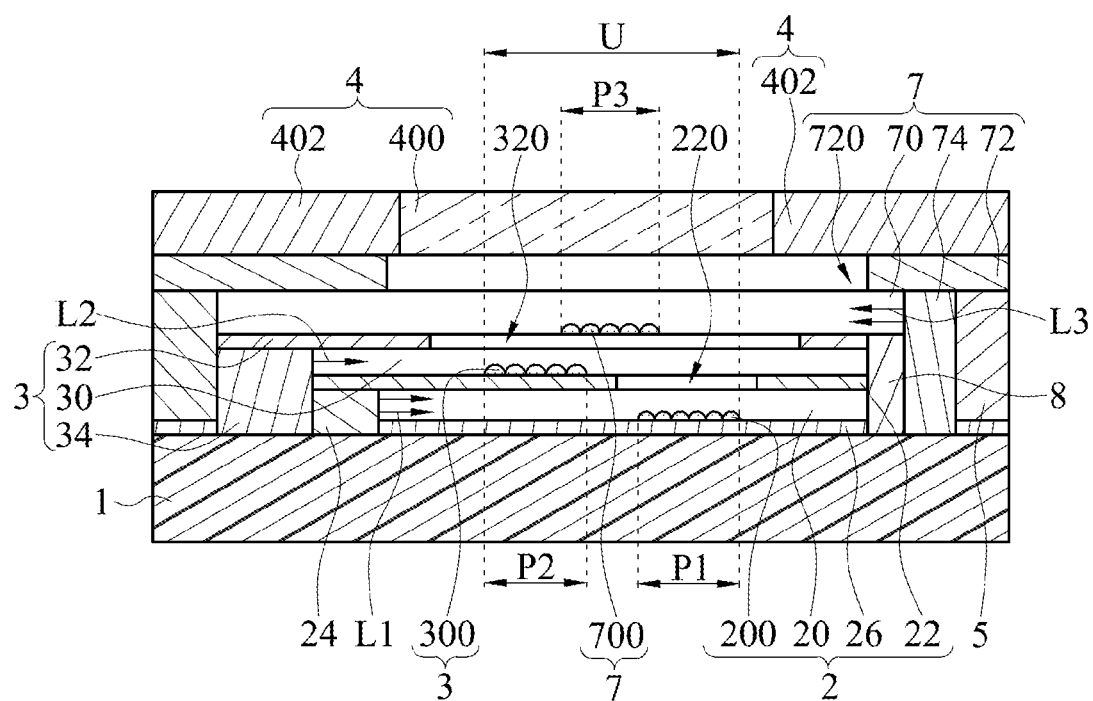
FIG. 5 is a schematic side view of a multilayer opto-electronic module according to some embodiments of the present invention.

Referring to FIG. 5, in some embodiments, the multilayer opto-electronic module includes a circuit board 1, a first light-emitting assembly 2, a second light-emitting assembly 3, a contact sheet 4, an external spacer 5, a third light-emitting assembly 7, and an intermediate spacer 8. The first light-emitting element assembly 24 is located between the second light-emitting element assembly 34 and the first light guide sheet 20, for blocking the second light L2 emitted by the second light-emitting element assembly 34 from reaching the first light guide sheet 20, serving as a light blocking structure between the second light-emitting element assembly 34 and the first light guide sheet 20. The intermediate spacer 8 is located between the third light-emitting element assembly 74 of the third light-emitting assembly 7 and the first light guide sheet 20 of the first light-emitting assembly 2 as well as the second light guide sheet 30 of the second light-emitting assembly 3, for blocking the third light L3 from entering the first light guide sheet 20, the first light-shielding structure 22, the second light guide sheet 30, and the second light-shielding structure 32. That is, the intermediate spacer 8 serves as a light blocking structure between the third light-emitting element assembly 74 and the first light guide sheet 20, the first light-shielding structure 22, the second light guide sheet 30, as well as the second light-shielding structure 32.

Based on the above, according to some embodiments, the multilayer opto-electronic module uses the light blocking structure located between the second light-emitting element assembly 34 and the first light guide sheet 20, and uses the light blocking structure between the third light-emitting element assembly 74 and the first light guide sheet 20 as well as the second light guide sheet 30 to effectively block lights emitted by one light-emitting element assemblies from reaching the light guide sheets and the light-shielding structures of other layers, thereby residual image and light leakage caused when each light-emitting assembly is individually illuminated can be eliminated. For example, when the second light-emitting assembly 3 is individually illuminated, the first light-emitting assembly 2 can be prevented from being simultaneously illuminated to affect the visual effect, thereby eliminating the problems of residual image and light leakage. In some embodiments, the multilayer opto-electronic module has light-absorbing films 224 and 324, to effectively reduce light disturbance caused by leakage of the first light L1, the second light L2, and the third light L3. In some embodiments, the multilayer opto-electronic module further includes a first reflecting film 226 and a second reflecting film 326, to effectively improve light utilization of the first light guide sheet 20 and the second light guide sheet 30. In some embodiments, the multilayer opto-electronic module further includes a light-absorbing film 26, to reduce light disturbance.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A multilayer opto-electronic module, comprising:
 a circuit board;
 a first light-emitting assembly, comprising:
  a first light guide sheet, above the circuit board, and having a first micro structure;
  a first light-shielding structure, above the first light guide sheet, and having a first opening, the first opening corresponding to the first micro structure; and
  a first light-emitting element assembly, below the first light-shielding structure and at one side of the first light guide sheet and electrically connected to the circuit board, when driven, the first light-emitting element assembly being configured to emit a first light towards the first light guide sheet;
 a second light-emitting assembly, comprising:
  a second light guide sheet, above the first light-shielding structure, and having a second micro structure;
  a second light-shielding structure, above the second light guide sheet, and having a second opening, the second opening corresponding to the first micro structure and the second micro structure; and
  a second light-emitting element assembly, below the second light-shielding structure and at one side of the second light guide sheet and electrically connected to the circuit board, when driven, the second light-emitting element assembly being configured to emit a second light towards the second light guide sheet; and
 a contact sheet, located above the second light-shielding structure, and having a top transparent area, the top transparent area corresponding to the second opening.

2. The multilayer opto-electronic module according to claim 1, wherein the contact sheet further has an opaque area adjacent to the top transparent area.

3. The multilayer opto-electronic module according to claim 1, wherein a cross-sectional area of the first opening is less than a cross-sectional area of the first micro structure.

4. The multilayer opto-electronic module according to claim 1, wherein the second light-shielding structure is a light-shielding sheet, the light-shielding sheet comprises a film and a light-absorbing film on the film, and the light-absorbing film faces the second light guide sheet, wherein the second opening passes through the film and the light-absorbing film.

5. The multilayer opto-electronic module according to claim 1, wherein the first light-shielding structure comprises a first reflecting film above the first light guide sheet, wherein the first opening passes through the first reflecting film.

6. The multilayer opto-electronic module according to claim 1, further comprising: an external spacer outside the first light-emitting assembly and the second light guide sheet and between the contact sheet and the circuit board, configured to block the first light and the second light from escaping from the multilayer opto-electronic module.

7. The multilayer opto-electronic module according to claim 1, further comprising: an internal spacer between the second light-emitting element assembly and the first light guide sheet, configured to block the second light from entering the first light guide sheet and the first light-shielding structure.

8. The multilayer opto-electronic module according to claim 7, wherein the internal spacer is a light-absorbing sponge, and the multilayer opto-electronic module further comprises two adhesive layers, respectively on surfaces of the light-absorbing sponge facing the second light guide sheet and the circuit board.

9. The multilayer opto-electronic module according to claim 7, further comprising: an external spacer, outside the first light-emitting assembly and the second light guide sheet and between the contact sheet and the circuit board, configured to block the first light and the second light from escaping from the multilayer opto-electronic module, wherein the internal spacer and the external spacer are integrally formed.

10. The multilayer opto-electronic module according to claim 7, further comprising:
 a third light-emitting assembly, comprising:
  a third light guide sheet, above the second light-shielding structure, and having a third micro structure;
  a third light-shielding structure, above the third light guide sheet, and having a third opening, the third opening corresponding to the first micro structure, the second micro structure, and the third micro structure;
  a third light-emitting element assembly, below the third light-shielding structure and at one side of the third light guide sheet and electrically connected to the circuit board, when driven, the third light-emitting element assembly being configured to emit a third light towards the third light guide sheet; and
 an intermediate spacer, between the third light-emitting element assembly and the second light guide sheet, configured to block the third light from entering the second light guide sheet and the second light-shielding structure.

11. The multilayer opto-electronic module according to claim 1, further comprising:
 a third light-emitting assembly, comprising:
  a third light guide sheet, above the second light-shielding structure, the third light guide sheet having a third micro structure;
  a third light-shielding structure, above the third light guide sheet, the third light-shielding structure having a third opening, the third opening corresponding to the first micro structure, the second micro structure, and the third micro structure;
  a third light-emitting element assembly, below the third light-shielding structure and at one side of the third light guide sheet and electrically connected to the circuit board, when driven, the third light-emitting element assembly being configured to emit a third light towards the third light guide sheet; and
 an intermediate spacer, between the third light-emitting element assembly and the first light guide sheet as well as the second light guide sheet, configured to block the third light from entering the first light guide sheet, the first light-shielding structure, the second light guide sheet, and the second light-shielding structure.

12. The multilayer opto-electronic module according to claim 1, further comprising: a light-absorbing film, below the first light guide sheet.

* * * * *